United States Patent [19]

Katayama

[11] Patent Number: 4,955,935
[45] Date of Patent: Sep. 11, 1990

[54] GEAR SHIFT DEVICE FOR AUTOMOTIVE VEHICLE

[75] Inventor: Kazuo Katayama, Kure, Japan

[73] Assignee: Mazda Motor Corporation, Hiroshima, Japan

[21] Appl. No.: 290,119

[22] Filed: Dec. 27, 1988

[30] Foreign Application Priority Data

Dec. 25, 1987 [JP] Japan .................. 62-330593

[51] Int. Cl.$^5$ ............................ B62D 1/18
[52] U.S. Cl. ................ 74/473 SW; 192/4 A; 70/252
[58] Field of Search ............ 74/473 SW; 70/252; 192/4 A

[56] References Cited

U.S. PATENT DOCUMENTS

| | | | |
|---|---|---|---|
| 1,650,651 | 11/1927 | Preston | 70/252 |
| 4,096,930 | 6/1978 | Viscardi | 192/4 A |
| 4,258,560 | 3/1981 | Jessop | 70/252 |
| 4,473,141 | 9/1984 | Mochida | 192/4 A |
| 4,762,015 | 8/1988 | Katayama | 74/473 SW |
| 4,779,477 | 10/1988 | Horton | 74/473 SW X |
| 4,798,067 | 1/1989 | Peitsmeier | 70/252 |

*Primary Examiner*—Peter A. Aschenbrenner
*Attorney, Agent, or Firm*—Fleit, Jacobson, Cohn, Price, Holman & Stern

[57] ABSTRACT

A column type automotive vehicle transmission shift device has a transmission shift control rod arranged substantially in parallel with a steering column and a transmission shift lever located on the transmission shift control rod for placing a transmission of an automotive vehicle in any desired range by moving the transmission shift lever. The transmission shift lever is rotatable around the axis of the transmission shift control rod to rotate the transmission shift control rod so as to place the transmission in the any desired range and displaceable in a direction of the axis to allow rotation of the transmission shift control rod. The column type automotive vehicle transmission shift device further has a locking mechanism for locking the transmission shift control rod moved to a range selecting position where placing the transmission in a predetermined range and an absorbing mechanism disposed between the transmission shift lever and the locking mechanism for absorbing operating power applied to the transmission shift lever.

33 Claims, 6 Drawing Sheets

GEAR SHIFT DEVICE FOR AUTOMOTIVE VEHICLE

BACKGROUND OF THE INVENTION

The present invention relates to a gear shift device for an automotive vehicle, and more particularly to a column type gear shift device incorporated in a column steering system.

Many known gear shift devices are structured having a selector lever or gear shift lever and a gear shift control rod that are associated with a steering unit. Such a gear shift device is disclosed in, for example, Japanese Unexamined Utility Model Publication No. 58-75,175 entitled "Tilt Handle Setup" issued May 20, 1983. This gear shift device includes a gear shift control rod supported by a steering column housing by means of a bracket.

Meanwhile, it is usual to provide interlock or anti-theft lock means cooperated with the gear shift lever for disabling a gear shift control rod from operating by way of switching off an engine when preparing to park a vehicle. In the gear shift device equipped with such an interlock or anti-theft lock means, if the gear shift lever is operated with a too heavy operating force while the gear shift control rod is locked or disabled from operating, it is likely to lead to breakage or damage of the interlock or anti-theft lock means. This is because such gear shift devices are designed to utilize the advantageous characteristic of the lever to operate the gear shift control rod with sufficient amplified force and the interlock means reacts directly to the action of the gear shift lever.

OBJECT OF THE INVENTION

It is, therefore, an object of the present invention to provide a gear shift device which prevents an interlock or anti-theft lock means from being broken or damaged even when too heavy a force is forcibly exerted through a gear shift lever.

SUMMARY OF THE INVENTION

The present invention is directed to a gear shift device for placing or shifting a transmission of an automotive vehicle in any desired gear range by pulling and then turning a gear shift lever. The gear shift lever is located on a gear shift control rod arranged substantially in parallel with a steering column and operationally coupled to and moving a selector member on a transmission and is rotatable around the axis of the gear shift control rod to rotate the gear shift control rod so as to place or shift the transmission in any desired gear range and displaceable in a direction of the axis to allow the gear shift control rod to rotate.

In a specific embodiment of the present invention the gear shift device comprises lock means for locking the transmission shift control rod at a predetermined range selecting position when placing the transmission in a predetermined range, and absorbing means disposed between the transmission shift lever and the locking mechanism for absorbing operating power applied to the transmission shift lever.

Accordingly, a specific feature of the present invention resides in the cooperation of the locking means with the absorbing means for disabling the gear shift control rod from causing axial displacement while the gear shift lever is operated with a heavy forcible operating force. In another preferred embodiment of the present invention, the gear shift device further comprises means associated with an ignition switch assembly for restraining the interlock means from releasing the locked gear shift control rod or its associated mechanism as far as a brake pedal of the automotive vehicle is released before the engine is switched on. Owing to the provision of the restraining means, although the gear shift lever can be operated, the gear shift control rod is rendered inoperative as far as the brake pedal is released, preventing an automotive vehicle from starting suddenly or lunging or lurching immediately after the engine is switched on.

BRIEF DESCRIPTION OF THE DRAWINGS

The above and other objects and features of the present invention will become apparent from the following detailed description taken in conjunction with the preferred embodiments thereof with reference to the accompanying drawings in which.

DETAILED DESCRIPTION OF THE INVENTION

Because column lever controlled gear shift controls are well known to those skilled in the art, the present description will be directed in particular to elements forming part of, or cooperating directly with, a gear shift device according to the present invention. It is to be understood that elements not specifically shown or described can take various forms well known to those ordinarily skilled in the vehicle art.

It is to be noted that throughout the specification the term "upper" or "upwardly" is used to mean and refer to the side of, or close to, a steering wheel, and the term "lower" or "downward" is used to mean and refer to the side opposite to the steering wheel or close to the opposite side.

Figure 1:
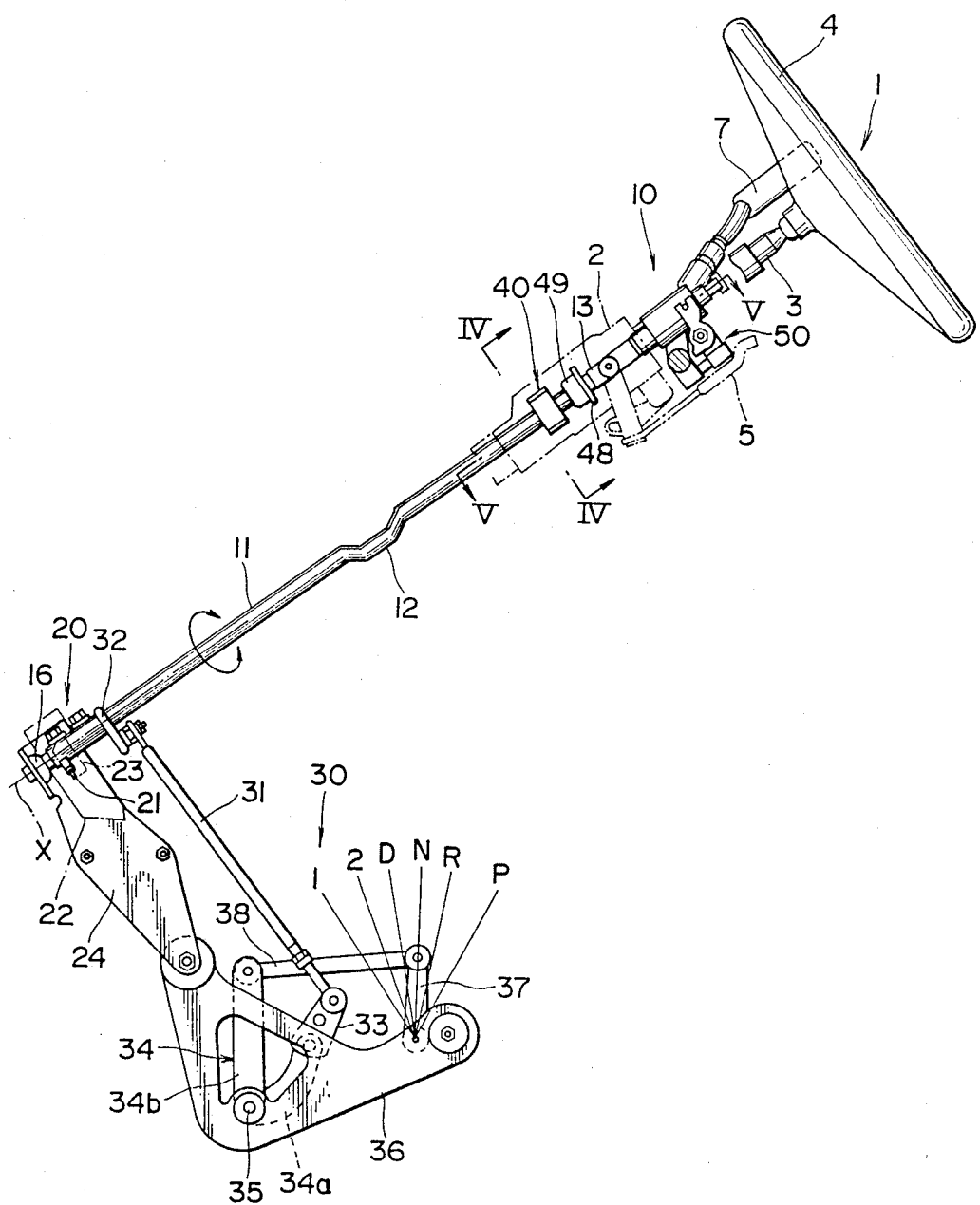
FIG. 1 is a schematic illustration showing a gear shift device according to a preferred embodiment of the present invention.

Referring now to drawings, in particular to FIG. 1, a column steering system of an automotive vehicle is shown incorporating a column gear shift device according to a preferred embodiment of the present invention. As shown, the steering system 1 is of a type well known to those skilled in the art and has a steering column housing 2 rotatably mounting or supporting a steering column 3 (partially shown) with a steering wheel 4 secured thereto. The steering column housing 2 of the steering system 1 mounts a gear shift mechanism 10 including a gear shift control rod 11. The gear shift control rod 11 comprises upper and lower sections connected to each other by means of a universal joint which will be described later. The lower section of the gear shift control rod 11 is operationally coupled to a parallelogram linkage 30 linked to a select valve of an automotive transmission which may take any type well known to those skilled in the art and need not be illustrated and explained therein. The gear shift mechanism 10 further includes a positioning unit 20 cooperated with the lower distal end of the lower section of the gear shift control rod 11 for positioning the gear shift control rod 11 at various angular positions when the automatic transmission is selectively shifted to desired gear ranges, such as first (1), second (2), drive (D), neutral or idling (N), reverse (R) and park (P) gear ranges. Close to the upper end of the lower section, the gear shift control rod 11 is provided with a detent mechanism 40 for giving a driver or operator a comfortable feeling of operation of a gear shift lever 7 which will be described later. In association with the gear shift mechanism 10, an anti-theft lock or interlock mechanism 50 for locking or disabling the gear shift mechanism 10, at a park position, from operating when an ignition key is at lock position or removed from an ignition key cylinder of an ignition switch assembly.

The parallelogram linkage 30 is operationally coupled to the gear shift control rod 11 by means of an upper connecting rod 31 through a first connecting member 32 at one end and to a second connecting member or adjusting arm 33 at the other end. The parallelogram linkage 30 includes a generally V-shaped bell crank arm 34 which is pivotally mounted on a crank shaft 35 secured to a supporting bracket 36 and pivotally connected to the adjusting arm 33 with one arm 34a and to a connecting rod 38 with the other arm 34b. A crank arm 37 of the parallelogram linkage 30 is operationally coupled to the select valve of the automatic transmission at one end and is pivotally connected to the connecting rod 38 at the other end. Due to the pivoted bell crank arm 34 and crank arm 37 connected to each other with the connecting rod 38, they can turn in parallel with each other when the upper connecting rod 31 moves lengthwise. Depending on turned angle of the gear shift control rod 11 about the axis of rotation X, the crank arm 37 is turned and selectively located at gear selecting positions, namely first gear, second gear, drive range, idle or neutral gear, reverse gear, and park positions designated by signs "1", "2", "D", "N", "R" and "P", respectively, to shift gears of the automatic transmission to a corresponding gear positions.

The gear shift control rod 11 is, at its lower end, slidably and rotatably supported for up and down movement by a bearing 16 mounted on a bracket 24 secured to a car body frame and slidably and rotatably mounted or supported by a bracket 48 secured to the steering column housing 2 through a bearing 49, thus being supported by the car body frame as well as the steering column 3. The gear shift control rod 11 is provided with a generally U-shaped bent portion 12 at the middle which serves as being shock-proof upon crashes or the like. The gear shift control rod 11 is divided into two sections, upper and lower halves connected to each other by means of a flexible universal joint 16' having a journal located coaxially with a center axis about which an upper section of the steering column 3 is turned up and down for allowing to tilt the gear shift device 10 as well as the steering wheel 4. For securing the steering wheel 4 at any possible tilted position, a steering wheel lock lever 5 is provided. The tilt mechanism of the steering column 3 can take any form well known to those skilled in the art.

Figure 2:
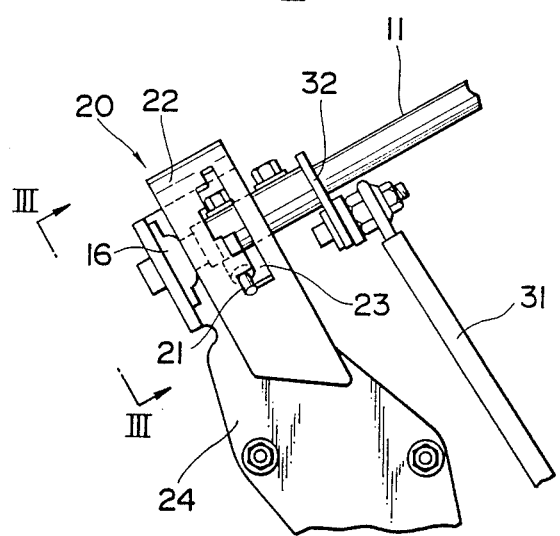
FIG. 2 is a partial enlarged detailed side view of a positioning unit.
Figure 3:
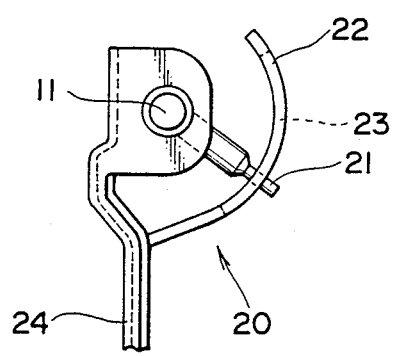
FIG. 3 is a view taken along line III—III of FIG. 2 in the direction of the arrows.

Referring now to FIGS. 2 and 3, the positioning unit 20 generally comprises a locating pin 21 extending radially outwardly from the distal end of the gear shift control rod 11 and a curved locating plate 22 secured to the supporting bracket 24. The locating plate 22 is formed with an opening 23 therein having locating steps which receive or engage the locating pin 21 to detain the shift control rod 3 at selected angular positions corresponding to the gear selecting positions.

Figure 4:
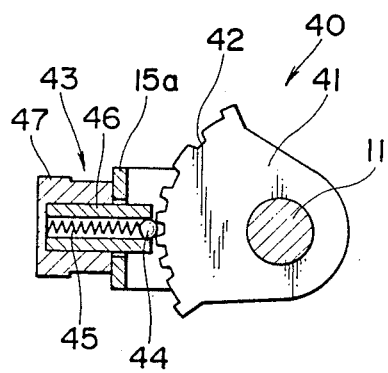
FIG. 4 is a cross section taken along the line IV—IV in FIG. 1.
Figure 5:
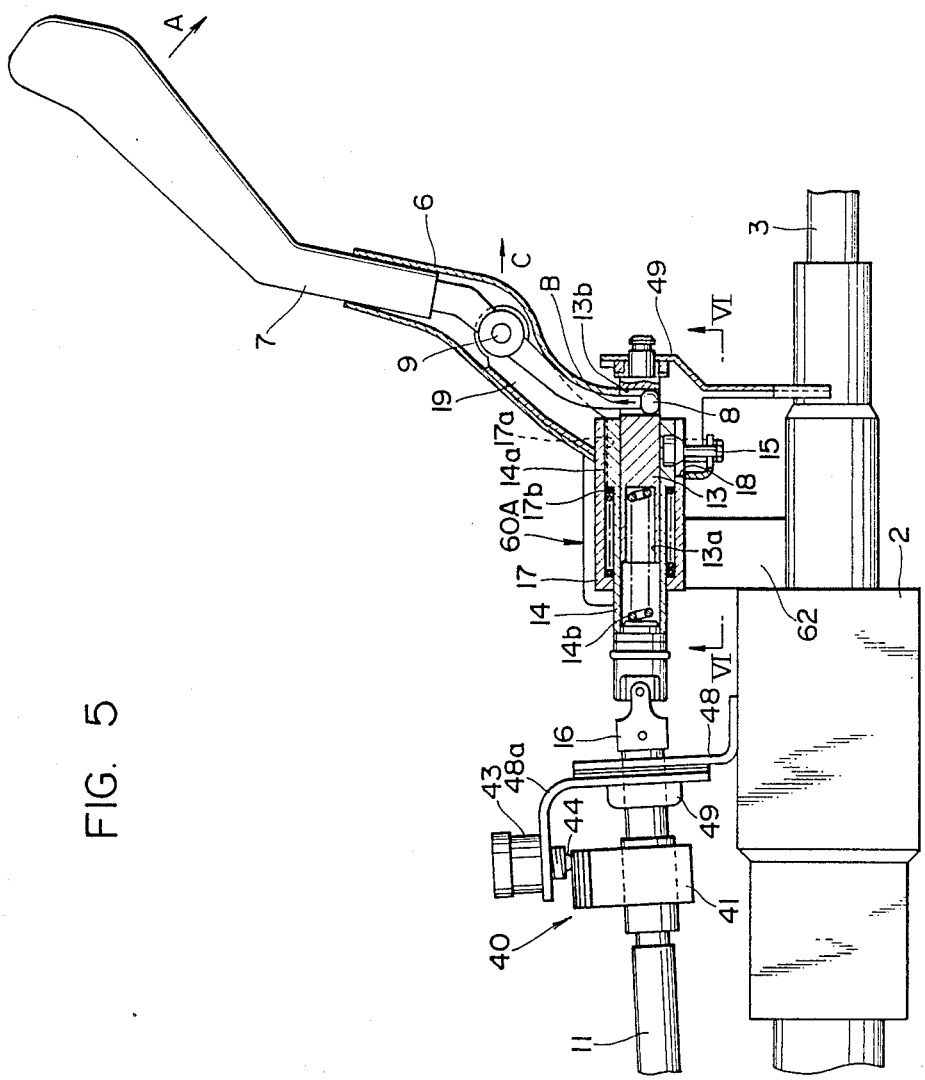
FIG. 5 is a partial detailed view, partally in cross-section taken along the line V—V in FIG. 1.

Referring now to FIGS. 4 and 5 there is shown in detail the detent mechanism 40. As shown, the detent mechanism 40 is located downward but close to the bracket 48 and comprises a sector-shaped detent block 41 with a plurality of parallel axial grooves 42 formed on the periphery thereof which is fixedly mounted on the gear shift control rod 11 at a certain distance from the bracket 48, and click stop means 43 connected to the bracket 48 through a generally L-shaped connecting bracket 48a. The click stop means 43 comprises a ball 44 and a coil spring 45 received in a sleeve 46 fitted in a body member 47, which coil spring 45 forces the ball 44 against one of the axial grooves 42 of the detent block 41. By virtue of the provision of the click stop means 43, the gear shift control rod 11 is turned followed by a moderate attractive force. Owing to the downward location of the detent mechanism 40, the sector-shaped detent block 41 will strike the bracket 48 to prevent the upward displacement of the gear shift control rod 11 will be caused under great impact loads such as occur upon car crashes. If in fact a car crash happens, impact load is absorbed by the bending action of the gear shift control rod 11 at the U-shaped bent portion 12 taking the detent block 41 as a support point. The supporting structure of the detent mechanism 40 can avoid the necessity of providing an extra stopper member or mechanism for preventing such upward displacement of the gear shift control rod 11 possibly caused upon car crashes.

Referring now to FIG. 5, the gear shift mechanism 10 is shown in detail and includes a guide rod 13 with one end fixedly supported by a bracket 49 secured to the steering column housing 2 and the other end formed with an axially extending blind bore 13a. This guide rod 13 has a diametric through bore 13b near its upper end and slidably and rotatably mounts thereon an inner cylindrical drum or sleeve member 14 which has an upper half section having an enlarged external diameter and a lower half section; the upper half section being formed with external serrations 14a and being provided with a coupling pin 15 externally laterally extending therefrom near its upper end and the lower half section being attached with the universal joint 16' secured to its lower end. Between the guide rod 13 and the universal joint 16' there is a coil spring 14b received partly in the blind core 13a of the guide rod 13 and partly in the inner cylindrical drum 14 to thrust the inner cylindrical drum 14 and hence the gear shift control rod 11 through the universal joint 16' downwards. The inner sleeve member 14 is serration-fitted in a bottom-flanged outer cylindrical drum 17 formed with internal serrations 17a, which outer cylindrical drum 17 is provided with a supporting bracket 19 integrally formed therewith or welded thereto and extending laterally upwardly for pivotally mounting a gear shift lever 7 on a shaft 9. The gear shift lever 7 has a ball stud 8 integrally formed therewith and slidably and snugly received in the diametric through bore 13b of the guide rod 13. It is noted that the ball stud 8 has a diameter larger than has the stem of the gear shift lever 7. As seen in FIG. 5, the outer cylindrical drum 17 is formed with a slot 18 through which the coupling pin 15 extends from the upper half of the inner cylindrical drum 14. A lower part of the gear shift lever 7 and the supporting bracket 19 extending from the outer cylindrical drum 17 are protected by a flexible tube 6 to prevent the entry of foreign articles into the inside of the gear shift mechanism 10.

Between the bottom flange of the outer cylindrical drum 17 and the lower end of the upper half section of the inner sleeve member 14 there is a coil spring 17b as an operating force absorbing member. It is noted that the coil spring 17b has a spring constant larger than the coil spring 14b so as to function as a shock absorber or damper for absorbing undesirably excessive external force if exerted on the guide rod 13 through the gear shift lever 7.

Pivotal movement of the gear shift lever 7 about the shaft 9 in a direction shown by an arrow A in FIG. 5 causes the ball stud 8 of the gear shift lever 7 to slide in the diametric through bore 13b in a direction shown by an arrow B while causing the shaft 9, supporting bracket 19 and outer cylindrical drum 17 to shift axially or in a direction shown by an arrow C taking the sliding ball stud 8 of the gear shift lever 7 as a supporting point. Owing to the coil spring 17b whose spring constant is larger than that of the spring coil 14b, the axial movement of the outer cylindrical drum 17 slidably thrusts back the inner sleeve member 14 compressing the coil spring 14b, shifting back the gear shift control rod 11 connected to the inner sleeve member 14 through the universal joint 16', so that the locating pin 21 of the locating unit 20 escapes from one of the locating steps of the opening 23 formed in the locating plate 22 to allow the gear shift control rod 11 to turn about the axis thereof.

When turning the gear shift lever 7 in one direction, clockwise or counterclockwise, about the axis of the shift control rod 11, after pulling it in the direction of arrow A, the gear shift control rod 11 is turned to select a desired one of the gear range selecting positions to shift the automatic transmission. Thereafter, when removing an external force exerted on the gear shift lever 7, and hence the return coil spring 14b, the return coil spring 14b expands to thrust downwardly the inner sleeve member 14, shifting forth the gear shift control rod 11 to bring the locating pin 21 into engagement with one of the locating steps of the opening 23 of the locating plate 22 corresponding to the selected gear position.

Figure 6:
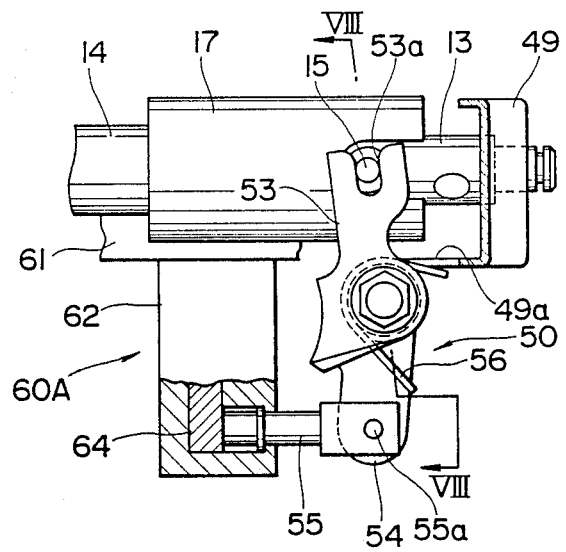
FIG. 6 is a cross section taken along the line VI—VI in FIG. 5, with an interlock mechanism locked.
Figure 7:
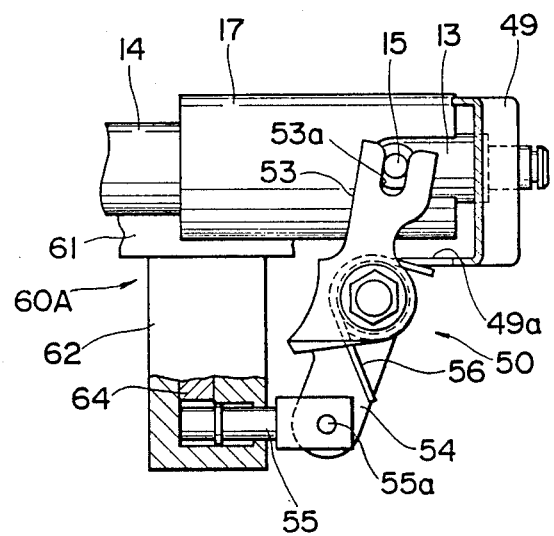
FIG. 7 is a view similar to FIG. 6, with the interlock mechanism released.
Figure 8:
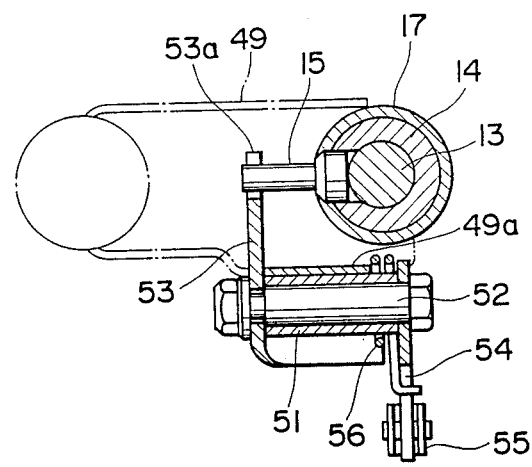
FIG. 8 is a cross section taken along the line VIII—VIII in FIG. 6.

Referring now to FIGS. 6 to 8, the interlock mechanism 50 is shown in detail including a support drum 51 secured to a support extension 49a of the support bracket 49. The support drum 51 snugly and rotatably receives or supports a shaft 52 having a lock lever 53 which is formed with an open-ended coupling slot 53a and bolted to one end thereof and a turn lever 54 mounted on the opposite end thereof. A plunger 55 is pivotally connected to the turn lever 54 with a connecting pin 55a. A torsion spring coil 56 is provided between the support drum 51 and the turn lever 54 to force or bias or urge the turn lever 54 to turn downwardly or in the clockwise direction as viewed in FIGS. 6 to 8.

It is noted that the support bracket 49 consists of a main portion supporting the guide rod 13 which is a stationary element of the gear shift mechanism 10. The support extension 49a supports the support drum 51 receiving the shaft 52 with the lock lever 53 secured thereto. This structural feature of the support bracket 49 makes the interlock mechanism 50 simple in structure, without providing an extra bracket and makes it possible to locate the coupling position between the coupling pin 15 and the lock lever 53 close to the support bracket 49, and hence the gear shift mechanism 10 or the gear shift lever 7, achieving an easy and certain coupling between the coupling pin 15 and the open-ended coupling slot 53a. Because, if the coupling pin 15 is located far away from the gear shift lever 7, the inner cylindrical drum 14 and its associated elements will certainly be subject to torsional deformation. This often leads to an uncertain coupling between the coupling pin 15 and the open-ended coupling slot 53a. That close location between these coupling elements, the coupling pin 15 and the coupling slot 53a of the lock lever 53, efficiently prevents such deformation of the inner cylindrical drum 14, making it certain and smooth to couple the coupling pin 15 and the coupling slot 53a.

It is also noted here that the interlock mechanism 50 is located and interconnected to the upper half section of the gear shift control rod 11 or gear shift mechanism 10 on the upper side of the universal joint 16'. This location of the interlock mechanism 50 enables tilt of the upper halves of the steering column 3 and the gear shift control rod 11, and the interlock mechanism 10 all together. It is accordingly realized to maintain the relative position of the interlock mechanism 50, in particular the plunger 55 thereof to a piston 64 slidably received in a cylinder 62 of an ignition switch assembly 60A which will be described in detail hereafter and thereby not needed to incorporate a position adjusting mechanism for adjusting the structural elements of the interlock mechanism 50 in position relative to the ignition switch mechanism 60A upon tilting the steering column 3. This is contributive to the structural simplicity of the interlock mechanism 50.

An ignition switch assembly 60A, which is well known per se in the art, is provided and associated with the plunger 55 of the interlock mechanism 50. As is shown in detail in FIG. 9, the ignition switch assembly 60A has a key cylinder 61 and a laterally extending cylinder 62 formed integrally with key cylinder 61 thereof. The laterally extending cylinder 62 has a shouldered vertical cylinder bore 63 and a radial bore 71 formed in a lower portion of the cylinder wall 70. The cylinder bore 63 slidably receives therein a piston 64 with a piston rod 65 which fixedly mounts or supports a spring retainer 66 close to the upper end thereof. Between the spring retainer 66 and the shoulder 63a of the cylinder bore 63, a coil spring or return spring 67 is disposed to force or bias or urge the piston 64 upwardly, thereby bringing it into slidable engagement with a control cam 68 integrally formed with a cam lobe 68a rotatably received in the key cylinder 61. The cam 68 is rotated with an ignition switch key 75. When the ignition switch key 75 is turned and positioned at the lock position (Lock) designated at 76, the cam 68 is turned in the clockwise direction as viewed in FIG. 9, so that the cam lobe 68a pushes down the piston rod 65 against the return spring 67 to slide down to the piston 64, thereby closing or blocking an opening of the radial bore 71 with the piston 64.

The plunger 55 pivotally connected to the turn lever 54 of the interlock mechanism 50 is partially received and slidable in the radial bore 71 of the cylinder 62. When the ignition key 75 is at the lock position 76, the piston 64 blocks the opening of the radial bore 71 to prohibit the plunger 54 from slidably entering into the cylinder bore 63 as shown in FIG. 6. On the other hand, when the ignition key 75 is at any one of other key positions, such as an accessory position (ACC), an ignition position (ON) and a start and prove out position, the piston 64 is forced up by the return spring to allow the plunger 54 to slidably enter into the cylinder bore 63 as shown in FIG. 7.

The lock lever 53 is brought into operational coupling to the inner slidable sleeve 14 through the engagement between the coupling pin 15 of the inner slidable sleeve 14 and the coupling slot 53a of the lock lever 53 only when the gear shift control rod 11 is turned and positioned to select the park position P. Through this pin-slot engagement, upward slide of the inner slidable sleeve 14, and hence the gear shift control rod 11, is permitted only when the ignition key 75 is turned to select any one key position other than the lock position (Lock) and, however, obstructed when the ignition key 75 is at the lock position (Lock) due to the plunger 54 disabled to enter into the cylinder bore 63. The gear shift lever 7 can accordingly be shifted upwardly and turned to select any desired gear shift position when the ignition key 75 is at the ignition position or else other than the lock position (Lock). However, the gear shift lever 7 is, although permitted to shift upwardly, obstructed to turn when the ignition key 75 is at the lock position (Lock) because the inner slidable sleeve 14 is prevented from moving upwardly.

In operation, the ignition key 75 is placed in the ignition switch key cylinder 61 and turned to the ignition position "ON" to switch on the engine. With turning the ignition key 75, the cam 68 turns in the counterclockwise direction as viewed in FIG. 9 to bring the cam lobe 68a away from the piston rod 65 to a position shown in FIG. 9. Owing to the return coil spring 67, the piston rod 65 is maintained in contact with the outer periphery of the cam 68 and gradually moves up following the turn of the cam 68 accordingly. The piston 64 is consequently pulled upwardly and fully opens the radial bore 71 of the cylinder 62 when the ignition key 75 is turned to the ignition key position "ON". As a result of the switching on of the engine, the plunger 55 of the interlock mechanism 50 is enabled to move and go into the radial bore 71.

For starting the car, the gear shift lever 7 is pivotally turned or pulled up to shift the automatic transmission into one of the gear ranges, usually the reverse "R" or the drive "D" gear range, or the neutral "N" gear range. Since the ignition key 75 has already been at the ignition key position "ON" to switch on the engine and the piston rod 64 of the ignition switch assembly 69 is accordingly displaced to open the radial bore 71 of the cylinder 62, the plunger 55 is allowed to slidably move and go into the radial bore 71 of the cylinder 62 of the ignition switch assembly 60A. That is, the lock lever 53 and the turn lever 54 are enabled to turn in the clockwise direction as viewed in FIG. 6 as one body, allowing the inner cylinder drum 14 operationally coupled to the lock lever 53 through the engagement between the coupling pin 15 and the coupling slot 53a to slide upwardly. Therefore, when the gear shift lever 7 is actually turned about the ball stud 8 thereof slidably moving in the diametric bore 13b of the guide rod 13 or pulled up, the outer cylindrical drum 17, which supports the gear shift lever 7 through the shaft 9 secured to the supporting bracket 19 and in which the inner cylindrical drum 14 is slidably fitted, moved upwardly or in the axial direction of the guide rod 13 to compress the coiled return spring 14b in the lower section of the guide rod 13 and thereby to push up the inner cylindrical drum 14 in the same direction by means of the coil spring 17b. Due to the upward movement of the inner cylindrical drum 14, the gear shift control rod 11 connected to the inner cylindrical drum 14 by means of the flexible universal joint 16' is also pulled upwardly, disengaging the locating pin 21 from one of the locating steps of the opening 23 formed in the locating plate 22 of the positioning unit 20. The gear shift control rod 11, and hence the gear shift lever 7, becomes turnable accordingly. To shift the automatic transmission into a desired one of the possible gear ranges, for example the neutral "N" gear range, the gear shift lever 7 is turned to turn the inner cylindrical drum 14 while being pushed up. The gear shift control rod 11 connected to the inner cylindrical drum 14 is turned to cause parallel movement of the parallelogram linkage 30 so as to select the neutral position "N" as is shown in FIG. 1, shifting the select valve of the automatic transmission to the neutral gear range. At this time, the coupling pin 15 of the inner cylindrical drum 14 is drawn from the coupling slot 53a of the lock lever 53. Letting the gear shift lever 7 loose after the selection of gear range, the return coil spring 14b expands to return downwardly the inner cylindrical drum 14, and hence the gear shift control rod 11, as well as the gear shift lever 7. Thus, the locating pin 21 is engaged with the locating step of the locating plate 22 to fix the parallelogram linkage 30 at the neutral position "N" shown in FIG. 1. The downward movement of the inner cylindrical drum 14 is followed by removal of the plunger 55 from the inside of the cylinder 62 of the ignition switch assembly 60A. In a same manner, the automatic transmission can be shifted to any desired gear range by operating the gear shift lever 7 as long as the ignition key 75 is plugged into the ignition key cylinder 61 and turned to the ignition key position "ON".

To shut off the engine, the ignition key 75 is turned to the accessory key position "ACC" and further to the lock key position "Lock" for drawing out. As a result, as was previously described, the cam 68 turns to push down the piston rod 65 with the cam lobe 68a, closing or blocking the radial bore 71 of the cylinder 62 of the ignition switch assembly 60A with the piston 64. It is noted that ordinary operation of the gear shift system before shutting off the engine is to shift the automatic transmission into the park gear range and, for this end, the gear shift lever 7 is turned back to shift the automatic transmission into the park gear range. When the gear shift lever 7 is actually turned back to cause the parallelogram linkage 30 to select the park gear range select position "P" and shifts the automatic transmission into the park gear range, the coupling pin 15 of the inner cylinder drum 14 and the coupling slot 53a of the lock lever 53 of the interlock mechanism 50 are brought into engagement with each other to thereby couple the gear shift mechanism 10 and the interlock mechanism 50 together as shown in FIG. 6. Once the automatic transmission is shifted into the park gear range and the ignition switch is turned off, the inner cylinder drum 14, and hence the gear shift control rod 11, is prevented from moving upwardly due to the prevention of movement of the plunger 55 into the inside of the cylinder 62 with the piston 64.

If the gear shift lever 7 is forcibly pulled, while the gear shift mechanism 10, in particular the inner cylinder drum 14, is locked by the interlocking mechanism 50, the outer cylinder drum 14 is allowed to slidably move upwardly relative to the inner cylindrical drum 14, with compressing the coil spring 17b. This upward movement of the outer cylindrical drum 14 is allowed by means of the coil spring 17b which is coactively disposed between the inner and outer cylindrical drums 14 and 17 and has a spring constant larger than that of the return coil spring 14b disposed between the inner cylindrical drum 14 and the guide rod 13.

Figure 9:
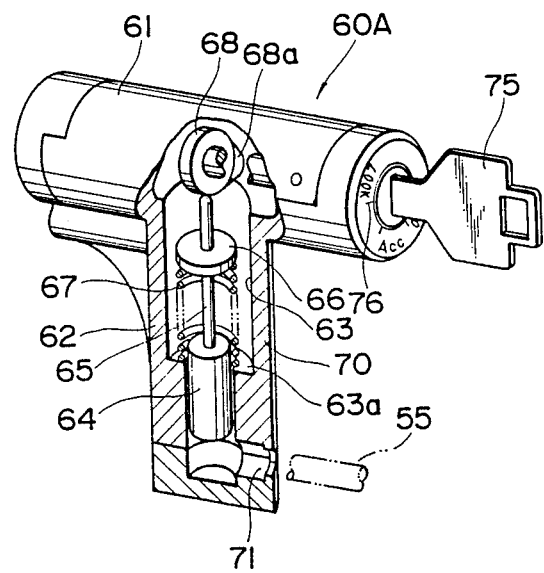
FIG. 9 is a schematic perspective illustration, partially in section, of an ignition switch assembly.
Figure 10A:
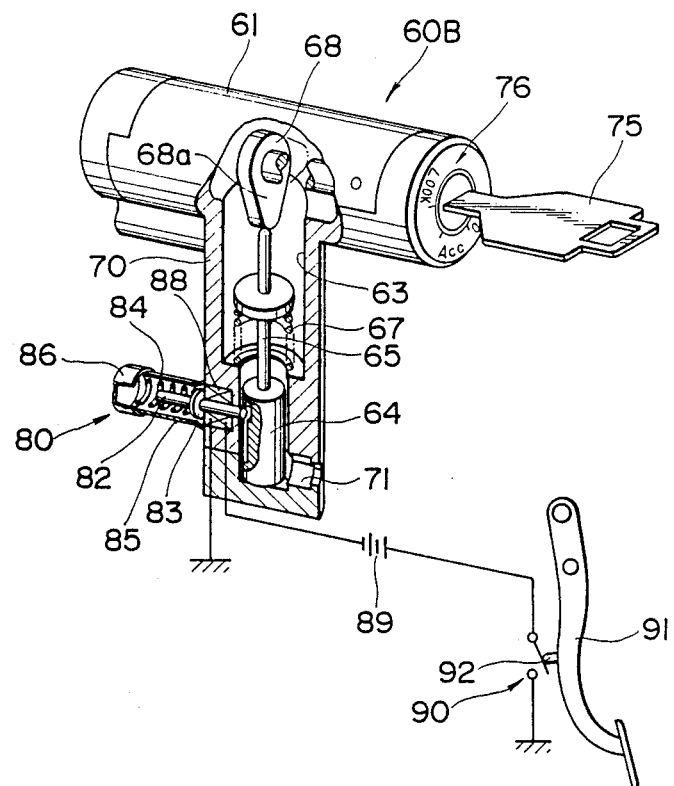
FIG. 10A is a schematic perspective illustration, partially in seotion, of an alternative ignition switch assembly.

Referring now to FIG. 10A showing a modified ignition switch assembly 60B of which the major components are substantially identical in operation and structure to those of the exemplary embodiment of FIG. 9 and denoted by the same reference numerals. The difference here is that a solenoid operated safety restraint mechanism 80 is incorporated to cooperate with the piston 64 of the ignition switch assembly 60B. This safety restraint mechanism 80 has a locking pin 82 with a collar 83 disposed in a barrel 85 extending laterally from the cylinder wall 70. The external end of the barrel 85 is closed with a screw cap 86. Between the collar 83 and the screw cap 86, a coil spring 84 is disposed in the barrel 85 to force or urge or bias the locking pin 82 to usually protrude inside the cylinder bore 63 of the cylinder 62. A solenoid 88 is embedded in the cylinder wall 70. A current source 89 is connected between the solenoid 88 and a normally open switch 90. The switch 90 is closed with a push rod 92 of a suspended brake pedal 91 when the brake pedal 91 is pressed on, activating the solenoid 88 to retract the locking pin 82. When the brake pedal 91 is released and thereby the switch is opened, the solenoid 88 is deactivated so that the locking pin 82 is forced to thrust or protrude inside the cylinder bore 63 of the cylinder 62 with the coil spring 84.

Figure 10B:
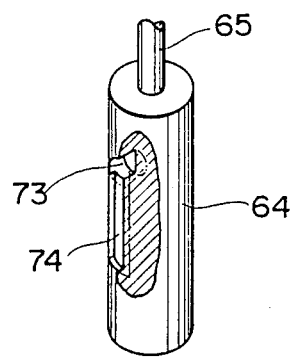
FIG. 10B is an enlarged perspective illustration, partially in section, of a piston of the ignition switch assembly of FIG. 10A.

As is shown in detail in FIG. 10B, the piston 64 is formed with a radially extending bore 73 and an axially extending groove 74 connecting to and shallower than the bore 73. The top end of the locking pin 82 is received in the radial bore 73 of the piston 64 when the piston 64 is fully lowered or slidably in the axial groove 74 while the piston 64 moves upwardly or downwardly.

The operation of the ignition switch assembly 60B is effected substantially in the same manner as the exemplary embodiment of FIG. 9. Assuming that the gear shift lever 7 is now positioned to select the park position and that the ignition key 75 is turned to the lock position "Lock" 76 as shown in FIG. 10A. The piston 64 is pushed down and lowered by means of the cam 68. The lock pin 82 of the safety restraint mechanism 80 is protruded inside the cylinder bore 63 by means of the return spring 84 to enters in the bore 73 of the piston 64 as far as the brake pedal 91 is not pressed to activate the solenoid 88. The gear shift mechanism 10 is accordingly locked by means of the interlock mechanism 50.

The ignition key 75 is placed in the ignition switch key cylinder 61 and turned to the ignition position "ON" to switch on the engine. With this turn of the ignition key 75, the cam 68 turns in the counterclockwise direction to bring the cam lobe 68a away from the piston rod 65 to a position shown in FIG. 10A. If, before or after turning the ignition key 75 to the ignition position "ON", the brake pedal 91 is not pressed and therefore the switch 90 is not closed, the solenoid 88 of the safety restraint mechanism 80 is not activated to retract the locking pin 82. Thus, the lock pin 82 still remains in the radial bore 73 of the piston 64 to prevent the piston 64 from moving up. As apparent, the plunger 53 is prevented from entering into the cylinder bore 63 of the cylinder 62 so that the interlock mechanism 50 can not release the gear shift mechanism 10. Therefore, the gear shift lever 7 is still rendered inoperative.

However, when the engine is switched on while the brake pedal 91 is pressed and the the solenoid 88 is thereby activated to retract the lock pin 82, the piston rod 65 is pulled upwardly following the turn of the cam 68 by means of the return coil spring 67. The piston 64 consequently moves up to fully open the radial bore 71 of the cylinder 62. Otherwise when, after the engine is switched on, the brake pedal 91 is pressed, the piston 64 is quickly pulled up by means of the return spring 67 to open the radial bore 71 of the cylinder 62. In any case, the interlock mechanism 50 releases the gear shift mechanism 10, enabling the gear shift lever 7 operative for starting the car. The car can be actually started by releasing the brake pedal 91 after pivotally pulling up the gear shift lever 7 and then turning it to shift the automatic transmission into a desired range, usually the reverse "R" or the drive "D" gear range, or the neutral "N" gear range. This is performed in the same way as described in connection with the previous exemplary embodiment.

When stopping the car, the brake pedal 91 is pressed and the gear shift lever 7 is turned back to the park range selection position to shift the automatic transmission into the park gear range before shutting off the engine. Thereafter, the ignition key 75 is turned to the lock key position "Lock" through the accessory key position "ACC". As a result, as was previously described, the cam 68 turns to push down the piston rod 65 with the cam lobe 68a, closing or blocking the radial bore 71 of the cylinder 62 of the ignition switch assembly 60B with the piston 64. Thus, the interlock mechanism 50 locks the gear shift mechanism 10. When the brake pedal 91 is released, the lock pin 82 is forced by the return spring 84 to protrude and enter into the radial bore 73 of the piston 64.

Although the present invention has been fully described by way of the specific embodiments thereof which are applied to an automotive vehicle equipped with an automatic transmission, it will be understood that various changes may be made in the form, details, arrangement and proportion of the parts. For example, it is permissible to replace the coil spring 17b disposed between the inner and outer cylindrical drums 13 and 17 as an operating force absorbing member with a cushion member having a predetermined or preselected proper elasticity or with a solenoid operated member displaceable under loads applied to the outer cylinder drum 13 through the gear shift lever 7 larger than a predetermined or preselected load. It is further permissible to provide, in place of the coil spring 17b for absorbing axial loads applied to the outer cylinder drum 17, an operating force absorbing member or structure such as including a torsion coil spring or the like for absorbing rotational drive loads applied to outer cylindrical drum 17 through the gear shift lever 7.

It should be noted that gear shift device according to the present invention can be embodied in automotive vehicles equipped with manual transmissions. It should be further noted that the interlock mechanism 50 can be changed to lock the gear shift mechanism 10 at a desired gear range such such as the neutral or idle gear range.

It will be understood that unless otherwise such changes and modifications depart from the scope of the present invention, they should be construed as included therein.

What is claimed is:

1. An automotive vehicle transmission shift device of the type having a transmission shift control rod supported substantially in parallel with a steering column by a steering column supporting member and a transmission shift lever which is located on said transmission shift control rod and is movable to displace axially and rotationally said transmission shift control rod so as to place a transmission of an automotive vehicle in any desired range, said transmission shift device comprising:
   locking means supported by said supporting member for locking said transmission shift control rod moved to a range selecting position when placing said transmission in a predetermined range; and
   absorbing means disposed between said transmission shift lever and said locking means for absorbing operating power applied from said transmission shift lever in said predetermined range to said locking means.

2. An automotive vehicle transmission shift device as defined in claim 1, wherein said transmission shift lever is located on said transmission shift control rod, and is rotatable around the axis of said transmission shift control rod to rotate said transmission shift control rod so as to place said transmission in any desired range and displaceable in a direction of said axis to axially displace said shift control rod so as to allow said transmission shift control rod to rotate.

3. An automotive vehicle transmission shift device as defined in claim 2, wherein said locking means restrains said axial displacement of said transmission shift control rod while said transmission shift lever is displaceable.

4. An automotive vehicle transmission shift device as defined in claim 2, wherein said locking means is rendered unreleasable when an ignition switch is turned off.

5. An automotive vehicle transmission shift device as defined in claim 2, wherein said transmission shift control rod is arranged substantially in parallel with a steering column and operationally coupled to and moving a selector member on a transmission for placing said transmission in any desired range.

6. An automotive vehicle transmission shift device as defined in claim 5, wherein said transmission shift control rod is divided into two section; upper and lower, which are connected by means of a universal joint.

7. An automotive vehicle transmission shift device as defined in claim 6, wherein said locking means is in cooperation with said upper section of said transmission shift control rod.

8. An automotive vehicle transmission shift device as defined in claim 6, wherein said upper section of said transmission shift control rod is telescopic.

9. An automotive vehicle transmission shift device as defined in claim 8, wherein said operating power absorbing means is incorporated in said telescopic upper section of said transmission shift control rod.

10. An automotive vehicle transmission shift device as defined in claim 8, wherein said operating power absorbing means is a coil spring.

11. An automotive vehicle transmission shift device as defined in claim 8, wherein said operating power absorbing means is solenoid operated power absorbing means.

12. An automotive vehicle transmission shift device as defined in claim 8, wherein said telescopic upper section of said transmission shift control rod comprises an inner cylindrical member and an outer cylindrical drum slidably receiving said inner cylindrical member therein between which a coil spring is incorporated as said operating power absorbing means.

13. An automotive vehicle transmission shift device as defined in claim 12, wherein transmission shift lever is pivotally mounted on said outer cylindrical drum.

14. An automotive vehicle transmission shift device as defined in claim 12, wherein said operating power absorbing means is a coil spring disposed between said inner cylindrical member and said outer cylindrical drum.

15. An automotive vehicle transmission shift device as defined in claim 12, wherein said inner cylindrical member is slidably fitted to a guide member attached to said steering column supporting member.

16. An automotive vehicle transmission shift device as defined in claim 15, wherein said inner cylindrical member is biased downwardly relative to said guide member by means of a coil spring.

17. An automotive vehicle transmission shift device as defined in claim 16, wherein said coil spring incorporated in said telescopic upper section of said transmission shift control rod has a spring constant larger than that of said coil spring biasing said inner cylindrical member downwardly relative to said guide member.

18. An automotive vehicle transmission shift device as defined in claim 15, wherein said guide member is supported for rotation by means of a bracket secured to an upper part of said steering column supporting member.

19. An automotive vehicle transmission shift device as defined in claim 18, wherein said upper bracket supports said locking means.

20. An automotive vehicle transmission shift device as defined in claim 6, wherein said lower section of said transmission shift control rod at its upper end is supported by a bracket secured to a lower part of said steering column supporting member.

21. An automotive vehicle transmission shift device as defined in claim 20, wherein said lower section of said transmission shift control rod is provided with detent means located close to said lower bracket.

22. An automotive vehicle transmission shift device as defined in claim 6, wherein said lower section of said transmission shift control rod is formed with a bent portion near its middle.

23. An automotive vehicle transmission shift device as defined in claim 1, wherein said transmission is of an automatic type.

24. An automotive vehicle transmission shift device as defined in claim 23, wherein said predetermined range is a park position.

25. An automotive vehicle transmission shift device as defined in claim 1, wherein said transmission is of a manual type.

26. An automotive vehicle transmission shift device as defined in claim 25, wherein said predetermined range is any one of ranges other than a neutral position.

27. An automobile vehicle transmission shift device for placing a transmission of an automotive vehicle in any desired range, said transmission shift device comprising:
 transmission shift means including a transmission shift control rod supported substantially in parallel with a steering column by a steering column supporting member and operationally coupled to and moving a selector member on a transmission of an automotive vehicle for placing said transmission in any desired range;
 a transmission shift lever rotatable around the axis of rotation of said transmission shift control rod to rotate said transmission shift control rod so as to place said transmission in said any desired range and displaceable in a direction of said axis to allow rotation of said transmission shift control rod;
 motion transmitting means located between said transmission shift control rod and said transmission shift lever for transmitting said axial displacement and rotation of said transmission shift lever to said transmission shift control rod;
 locking means supported by said supporting member for releasably locking said motion transmitting means to disable it from transmitting said axial displacement of said transmission shift lever to said transmission shift control rod when said transmission shift lever is at a predetermined rotated position where said transmission is placed in a selecting position when placing said transmission in a predetermined range; and
 absorbing means disposed between said transmission shift lever and said locking means for absorbing operating power applied from said transmission shift lever in said predetermined range to said locking means.

28. An automobile vehicle transmission shift device as defined in claim 27, wherein said locking means includes a member which is cooperated with ignition switch means of said automotive vehicle to move to a lock position where said locking means locks said motion transmitting means when said ignition switch is turned to shut off said engine and to a release position where said locking means unlocks said motion transmitting means when said ignition switch is turned to switch on said engine.

29. A transmission shift device as defined in claim 28, wherein said locking means includes another locking means for allowing said member to move to said release position when a brake pedal of said automotive vehicle is pressed.

30. A transmission shift device as defined in claim 27, wherein said transmission is of an automatic type.

31. An automotive vehicle transmission shift device as defined in claim 30, wherein said predetermined range is a park position.

32. An automotive vehicle transmission shift device as defined in claim 27, wherein said transmission is of a manual type.

33. An automotive vehicle transmission shift device as defined in claim 32, wherein said predetermined range is any one of ranges other than a neutral position.

* * * * *